United States Patent [19]

Andrieu et al.

[11] 4,088,534
[45] May 9, 1978

[54] CASING FOR THE FUEL ELEMENTS OF A WATER-COOLED NUCLEAR REACTOR

[75] Inventors: Jean-Louis Andrieu, Paris; Jacques Delafosse, Gif-sur-Yvette, both of France

[73] Assignee: Commissariat a l'Energie Atomique, Paris, France

[21] Appl. No.: 690,183

[22] Filed: May 26, 1976

[30] Foreign Application Priority Data

Jun. 4, 1975 France .................................. 75 17468

[51] Int. Cl.² .............................................. G21C 9/00
[52] U.S. Cl. .................................. 176/38; 176/19 R; 176/61; 176/86 R
[58] Field of Search ................... 176/37, 38, 19 R, 61, 176/86 L, 86 R, 86 M

[56] References Cited

U.S. PATENT DOCUMENTS

| | | | |
|---|---|---|---|
| 3,158,543 | 11/1964 | Sherman et al. | 176/17 |
| 3,300,388 | 1/1967 | Jerman et al. | 176/19 |
| 3,354,040 | 11/1967 | Frame et al. | 176/19 |
| 3,480,510 | 11/1969 | Anthony | 176/35 |
| 3,816,245 | 6/1974 | Bevilacqua | 176/61 |
| 3,819,476 | 6/1974 | Pocock et al. | 176/37 |
| 3,929,565 | 12/1975 | Fredin et al. | 176/35 |

FOREIGN PATENT DOCUMENTS

| | | | |
|---|---|---|---|
| 2,316,006 | 10/1974 | Germany | 176/86 L |
| 2,005,391 | 8/1971 | Germany | 176/86 L |
| 2,434,226 | 2/1976 | Germany | 176/86 L |
| 1,564,311 | 9/1969 | Germany | 176/86 L |
| 2,442,425 | 3/1975 | Germany | 176/86 R |
| 7,038,120 | 11/1966 | Japan | 176/38 |

*Primary Examiner*—Samuel W. Engle
*Assistant Examiner*—Ralph Palo
*Attorney, Agent, or Firm*—Cameron, Kerkam, Sutton, Stowell & Stowell

[57] ABSTRACT

The casing is made up of a number of identical compartments of prismatic shape in which are placed vertically either one or a number of fuel element bundles which are not secured to the casing, the casing walls being provided with means for guiding control rods, supplying emergency coolant and positioning measuring devices. At least some of the casing walls are constituted by two parallel thin metal sheets welded at intervals to stiffening webs which extend between the two metal sheets to the full height of the casing and parallel to the axis of the reactor.

3 Claims, 10 Drawing Figures

CASING FOR THE FUEL ELEMENTS OF A WATER-COOLED NUCLEAR REACTOR

This invention relates to a casing for the fuel elements of a water-cooled nuclear reactor and to a reactor core for the practical application of the invention.

In nuclear power reactors of the light water cooled type, the design concept of the reactor core is characterized by a predetermined arrangement of various elements having different functions, the main elements being the fuel elements, neutron absorbers and structures which are intended to ensure position-maintenance of the entire core assembly.

As a general rule, the reactor core is fixed on a bottom support grid provided with openings for the flow of coolant. The fuel elements are constituted by assemblies or unitary bundles of fuel pins or plates disposed vertically within the reactor core and mounted within wrappers or casings which constitute mechanical supports for the fuel elements and guides for the flow of coolant within each unitary fuel assembly. Neutron-absorbing units are placed at intervals in predetermined positions between the unitary fuel assemblies in order to carry out the control of the nuclear reaction by insertion or withdrawal of said units. Similarly, the measuring instruments which are necessary for checking the operation of the reactor are placed at predetermined locations and safety devices are provided for injecting emergency water in the event of leakage or interruption of flow in the primary coolant circuit, these devices being intended to guard against fast heat build-up within the fuel in the event of such an occurrence.

In this known type of arrangement, the structures which serve to maintain the core assembly are constituted by the casings which are rigidly fixed to the unitary fuel assemblies. These casings are supported by the bottom grid of the reactor and are so arranged as to leave gaps which serve to guide the control rods. The measuring instruments are brought in from the exterior of the reactor to positions located within the interior of each fuel casing.

The main disadvantages of this mode of assembly arise from the fact that the fuel assemblies are rigidly fixed to the casings in which they are mounted. In fact, in order to carry out loading or unloading of an elementary fuel assembly in this case, it proves necessary to remove the measuring instruments which are placed within said fuel assembly and to discharge the complete unit consisting of the fuel elements and casing which is considered in this case as being "expendable".

It has already been proposed, especially in French Pat. No. 2,243,495, to overcome the above-mentioned disadvantages by means of a reactor fuel-element casing constituted by a number of identical modules or compartments of prismatic shape having either a square or rectangular cross-section, there being placed vertically within each compartment one or a number of bundles of fuel elements which are not rigidly fixed to said compartment; the walls of said casing are then provided with means for guiding the control rods, with means for supplying emergency coolant and means for positioning measuring devices.

In this form of construction, each face of one compartment is common to two adjacent compartments and the casing is constituted by the assembly of flat walls which form the faces of the compartments.

This structure is primarily distinguished by the fact that it permits loading and unloading of fuel elements without any need to remove the casing from the reactor although it remains possible to remove this latter also if the need arises. The casing walls themselves are provided with the recesses which are intended to accommodate the absorber rods for controlling the chain reaction as well as with the orifices for the flow of emergency coolant and for the introduction of devices for irradiation experiments.

The aim of the present invention is to provide a casing for the fuel elements of a water-cooled reactor, which is of improved design with respect to the structure mentioned in the foregoing and makes it possible in the event of an accident condition to inject emergency coolant under exceptionally good conditions.

The essential feature of said casing lies in the fact that at least some of the casing walls are constituted by two parallel metal sheets of small thickness welded at intervals to stiffening webs which extend between said two metal sheets to the full height of the casing and parallel to the axis of the reactor.

In accordance with the invention, there is thus provided in a simple manner a rigid structure having sufficiently high strength to receive the core fuel elements which are independent of said structure. In conjunction with the stiffening webs, the two metal sheets which constitute the wall of said structure form the different recesses or cavities which are necessary for the transfer or positioning of the fuel element auxiliaries of the reactor core proper.

Thus the guiding means for each control rod consist of cavities formed between the two metal sheets of the casing wall up to the full height of this latter. The means for supplying emergency coolant are constituted by orifices pierced and spaced at intervals in the casing walls; said orifices permit the discharge of the emergency coolant which is admitted within the thickness formed between the two metal sheets of the casing wall. The means for positioning the measuring devices consist of recesses which are also formed in the thickness of the casing wall.

In a preferred embodiment of the invention, the flat metal sheets of small thickness which form the casing walls are disposed within the reactor core in two directions at right angles to each other, thus resulting in the formation of casing compartments having a rectangular cross-section. In this mode of execution, it is in fact an advantage to form the compartments in such a manner as to ensure that all compartments have the same rectangular cross-section. It is then an easy matter to fill the plane (cross-section along a plane at right angles to the axis of the reactor) with rectangles of this type which are assembled so as to occupy a zone having an approximately circular cross-section.

In a first embodiment of the present invention, the stiffening webs are constituted by flat arrays of vertical and tangent tubes welded in a sandwich arrangement between two flat metal sheets of small thickness, at least a number of said vertical and tangent tubes being pierced along the generating line of contact between said tubes and said flat sheets by holes which establish a communication between the interior of said tubes and the internal space of the casing compartments.

The essential advantage of this first embodiment of the present invention lies in the fact that, as is readily apparent, the casing walls are formed by means of a structure which is simple to manufacture since it consists only of perforated flat metal sheets and cylindrical tubes welded to each other. This simple structure is nevertheless capable of affording a sufficient degree of strength and rigidity to constitute the base structure of the reactor core. By making use of hollow tube components, said structure also makes it possible to accommodate absorber rods which serve as control rods, to conveniently provide means for supplying emergency coolant and also to provide locations for the positioning of measuring devices.

The structure described in the foregoing makes it particularly convenient to construct the emergency injection systems since it is only necessary to supply coolant water to the vertical cylindrical tubes constituting the casing walls themselves and at the same time to provide at least a certain number of said vertical tubes with holes drilled along the generating line of welding to the two thin flat metal sheets between which said tubes are welded in a sandwich arrangement. It is thus an easy matter to provide a system for spraying the plates of the fuel element bundles at the time of occurrence of an accident leading to blowdown, or discharge of the primary coolant water from the reactor vessel.

In an alternative and advantageous embodiment of the present invention, said vertical tubes pierced by orifices which communicate with the interior of the casing compartments are supplied with liquid at both ends, namely on the one hand at the top end with emergency coolant via an admission duct formed directly within the upper grid of the reactor core and on the other hand at the bottom end with emergency poisoning liquid (usually consisting of water containing boron) via an admission duct which is connected to the bottom plate for supporting the reactor core. Since the liquids employed respectively for emergency injection and emergency poisoning are usually injected at appreciably different pressures, it is preferable in this case to provide near the central portion of each tube a diaphragm having a reduced section which makes it possible at the time of startup of the emergency systems to prevent the poisoning liquid at high pressure from spreading rapidly within the emergency injection circuit which is usually at a much lower pressure and operates under the action of gravity.

In another alternative embodiment, the vertical tubes are specialized, a certain number of tubes being supplied only with emergency injection water whilst the others are supplied only with poisoning liquid, thus making it possible in this case to avoid having to provide a reduced-section diaphragm in the central portion. In this case also, the vertical tubes can clearly be supplied indifferently from the top or the bottom since they form two independent families so far as their supply circuits are concerned.

One of the advantages of this first embodiment of the present invention also lies in the fact that the presence of hollow cylindrical tubes in the casing walls very readily permits the introduction of removable neutron-absorbing material. Said material is constituted by rods each having an external diameter which is substantially equal to the internal diameter of each tube. These absorber rods are thus disposed in the form of flat arrays at certain predetermined points of the core structure. It is an advantage, however, to form a geometrically balanced lattice in a cross-section of the reactor core by constructing the absorber elements in the form of cruciform arrays, the center of which is a tube located at the point of junction of two thin flat metal sheets disposed at right angles to each other. In this manner, the two flat arrays which form the cross of an absorber element are disposed symmetrically with respect to the central rod which is housed within the tube located at the intersection of two casing walls at right angles.

In a second embodiment of the present invention, the stiffening webs are constituted by solid metal bars having the shape of a rectangular parallelepiped which are spaced at uniform intervals and define between the two thin parallel metal sheets free spaces which are also parallelepipedal.

This second embodiment is of even simpler technological design than the first and permits the same performances by utilizing the free spaces either for the passage of the control absorbers in the form of sliding strips or for the injection of emergency water which is then distributed within the core compartments through series of orifices provided for this purpose at different levels in the thin parallel metal sheets which form the casing walls. In accordance with the invention, the free spaces aforesaid can be employed in some cases for the introduction of measuring devices.

A more complete understanding of the invention will in any case be obtained from the description which is given hereinafter and relates to a number of embodiments of the casing for a nuclear reactor fuel element in accordance with the present invention. Reference will be made in the following description to the accompanying drawings which are given by way of explanatory illustration and not in any limiting sense, and in which.

Figure 1:
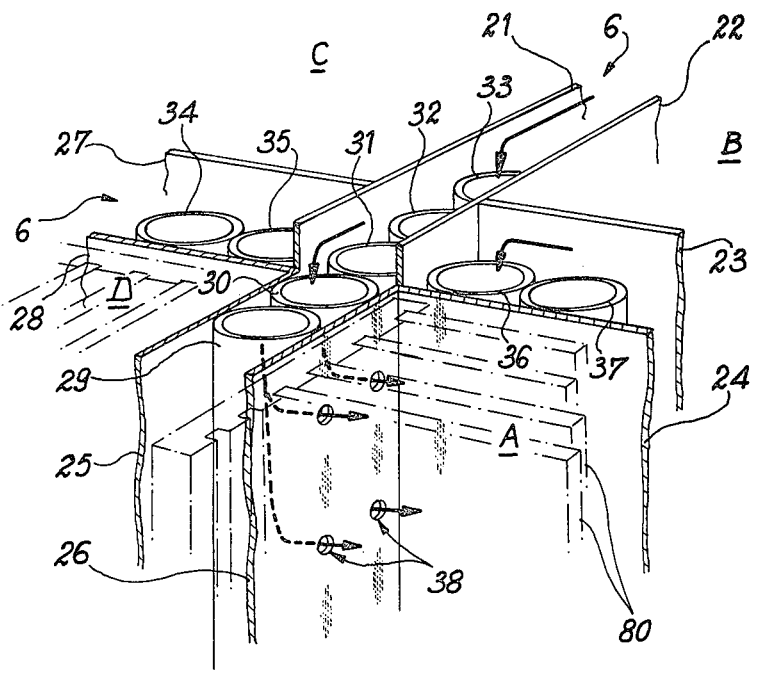
FIG. 1 shows a schematic diagram of construction of the casing walls in the first embodiment.

Referring now to FIG. 1, there will now be described the general diagram of construction of the walls of the casing in accordance with the first embodiment of the present invention. There can be seen in this first figure two casing walls each made up of two thin flat and vertical metal sheets 21 and 22, 23 and 24, 25 and 26, 27 and 28. In accordance with the invention, these thin vertical metal sheets are welded to a series of tubes such as those designated by the references 29, 30, 31, 32, 33 which are sandwiched between the metal sheets 21 and 22; the tubes 34 and 35 are welded between the metal sheets 27 and 28 and the tubes 36 and 37 are welded between the metal sheets 23 and 24.

In accordance with the invention, orifices such as the orifice 38 are pierced in the vertical metal sheets such as the sheet 26 of FIG. 1 along generating lines of contact between the vertical tubes such as the tubes 29 and 30 and the flat vertical sheets such as the sheet 26. Said orifices are formed within the thickness both of the tubes and of the flat vertical sheets, thus establishing a communication between the interior of said tubes and the interior of a compartment such as the compartment A. That portion of casing structure which is illustrated in FIG. 1 delimits four compartments which are partly visible in the figure and are designated by the references A, B, C and D. As can readily be understood, the emergency injection-water orifices such as those designated by the reference 38 are formed in accordance with the invention in the walls of the compartments such as 26 which are located at right angles to the direction of the plates 80 of the fuel element which is adjacent to said wall, said plates 80 being shown in chain-dotted lines in FIG. 1.

Figure 2:
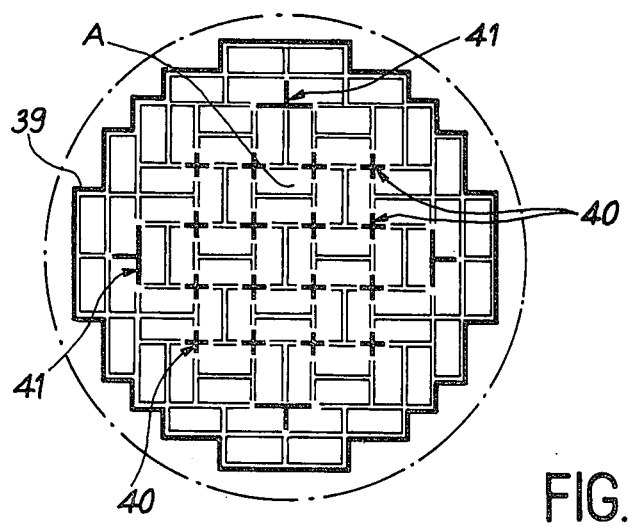
FIG. 2 shows a cross-section of a light-water reactor core fitted with the casing in accordance with the present invention.
Figure 3:
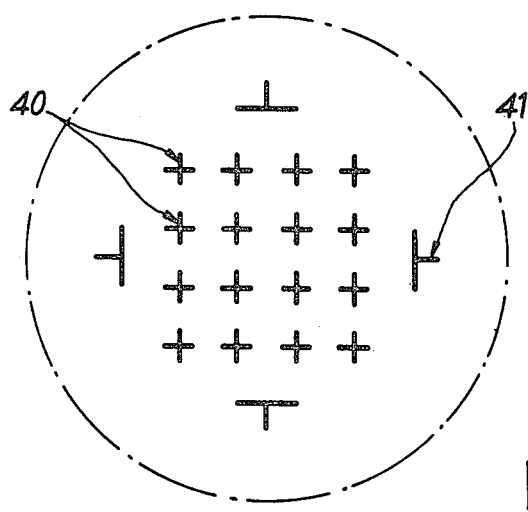
FIG. 3 shows a possible positional arrangement of the control rods within a structure according to FIG. 2.

In the embodiment of FIG. 2, the cross-section of a light-water nuclear reactor core is constituted by an assembly of unitary compartments such as A which have a rectangular shape and are all equal. In one particular form of construction, said compartments have a dimension of 100 × 200 mm, two associated compartments being thus intended to form a square assembly. In this example, the external contour of the reactor core which is formed by means of a metal sheet 39 of suitable thickness constitutes a peripheral band which is usually of stainless steel and serves to maintain all the fuel elements in position. It is apparent from FIG. 2 that the assembly of these different reactangular compartments makes it possible to occupy a substantially circular surface with a relatively high coefficient. In this particular example, the entire surface thus comprises 74 rectangular compartments such as the compartment A.

In accordance with the invention, the tubes such as 29 are employed among other things for accommodating rods of neutron-absorbing material which are grouped together in rows or flat arrays so arranged as to be removable within said tubes. It can of course be appreciated that the structure according to the invention makes it possible to dispose said control rods in any desired positional arrangement according to the neutron flux distribution of the reactor; in the particular case of FIG. 2, the lattice of control rods comprises a total of twenty cruciform rods each constituted by two flat arrays of rods which are placed at right angles with respect to each other and the center of which is a tube located at the junction of two thin metal sheets. The complete assembly thus consists of four series of four cruciform rods such as the rod 40 completed at the four extremities by four T-shaped rods such as the rod 41.

It is readily apparent that any other arrangement of the control rods within the spaces left free between the plates is clearly possible.

Figure 4:
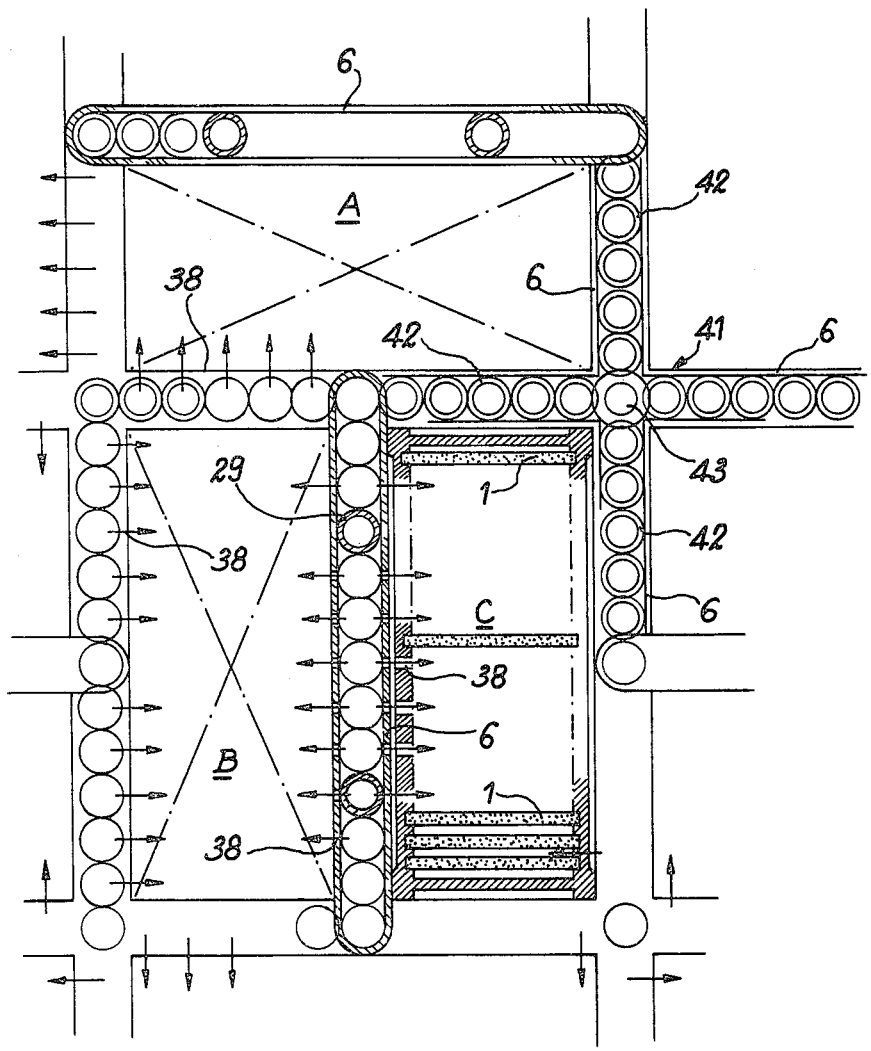
FIG. 4 is a view to a larger scale showing the cross-section of three compartments of the structure according to FIG. 2.

There is shown in greater detail in FIG. 4 the arrangement of three adjacent compartments A, B and C, in which B and C themselves constitute a square. In accordance with the invention, the walls 6 of these different compartments are welded to a series of tubes such as the tube 29, orifices 38 being formed in said walls for the injection of emergency coolant water or of poisoning liquid into the interior of the compartments A, B and C. There are shown diagrammatically within the compartment C a few fuel plates 1 of a fuel-element bundle which is inserted within said compartment. It should be noted that the plates 1 are perpendicular to the adjacent wall 6 of the compartment C in order to permit the injection of emergency water between said plates 1. FIG. 4 also shows in detail one of the cruciform neutron-abosrbing control rods 41 constituted by two flat arrays of hafnium rods such as 42 which are located at right angles to each other. These two perpendicular arrays are centered on the rod 43 which is located at the point of intersection of two vertical walls 6.

Figure 5:
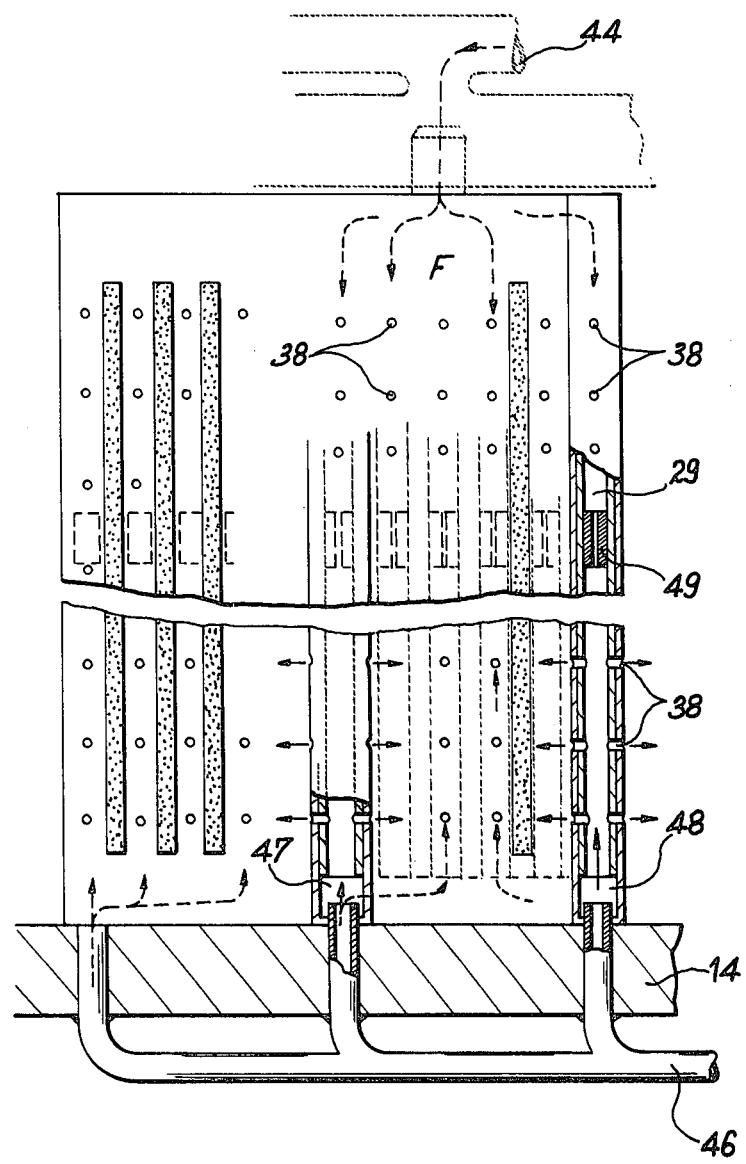
FIG. 5 is a view in sectional elevation showing the device for the supply of emergency water and of poisoning liquid to the tubes of the structure in accordance with the invention.

FIG. 5 now shows the constructional detail of the devices for supplying the reactor with emergency water and with poisoning liquid. There can again be seen in this diagram the vertical tubes 29 of the structure described above, one flat array of which is illustrated in sectional elevation in the figure. The top portion of each vertical tube 29 aforesaid is supplied with emergency coolant water by means of a duct 44 which can in some cases be arranged in the upper reactor grid. If necessary, said water penetrates into each of the tubes along the path of the arrows F and is discharged into the different adjacent compartments through the orifices 38. A duct 46 for the supply of poisoning liquid is located at the bottom of the structure and in turn supplies a certain number of ducts or manifolds 47 and 48 which serve to feed the tubes 29. Similarly, when the ducts 47 and 48 are put under pressure, the poisoning liquid is discharged into the interior of the reactor through the orifices 38. As explained earlier, a diaphragm 49 having a reduced passage is provided within the central section of each tube 29 in order to prevent the mechanical shock which could result, at the moment of simultaneous starting of the two circuits, from the pressure difference between the emergency poisoning circuit (which is at high pressure) and the spraying circuit for emergency injection (which is at low pressure).

Figure 6:
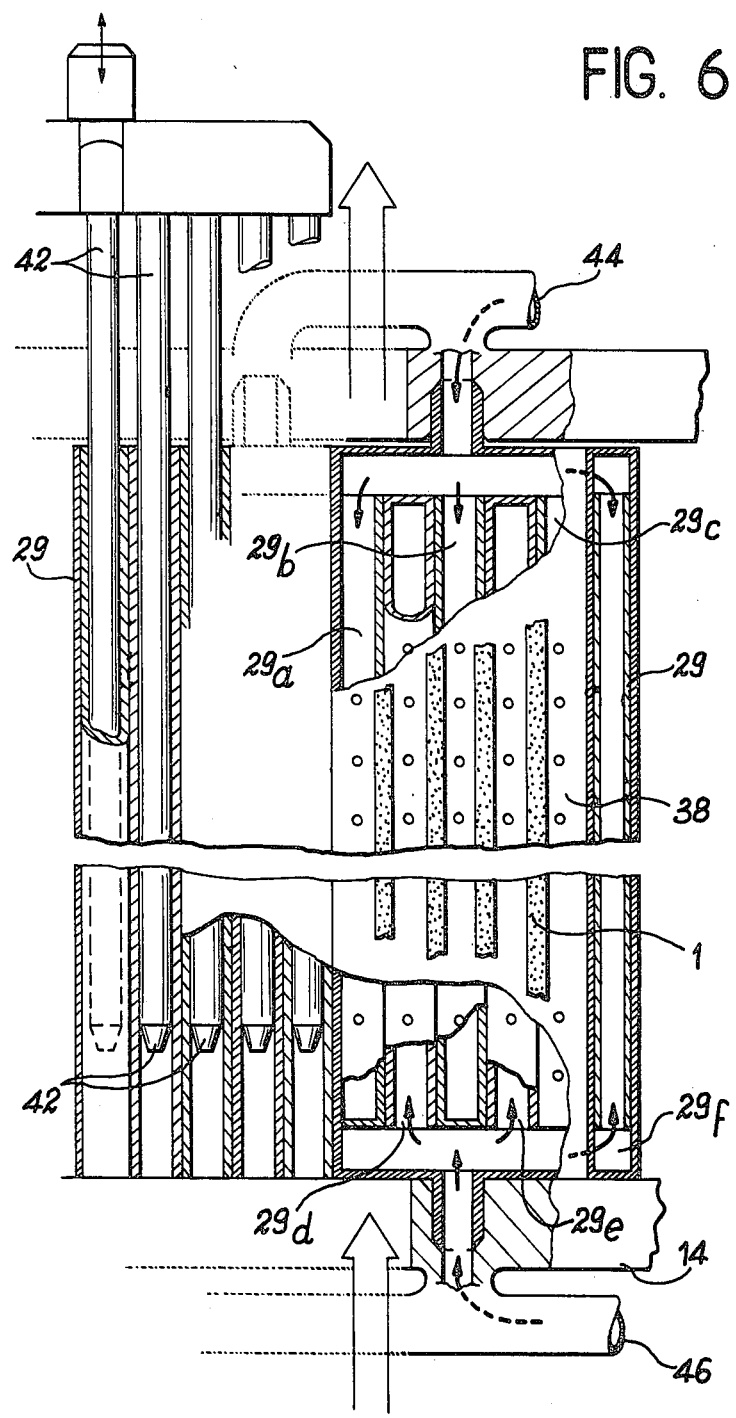
FIG. 6 is an alternative embodiment of the device of FIG. 5 in which one tube out of two of said structure is specialized respectively in emergency cooling and in emergency poisoning.

In FIG. 6, an alternative form of the embodiment of FIG. 5 is shown in sectional elevation along a vertical plane which contains the axes of the tubes 29 of a single flat array. In this alternative form of construction, the tubes 29 which are not provided with a central diaphragm are supplied alternately with emergency coolant water as is the case with the tubes 29a, 29b and 29c by means of the manifold 44, and with poisoning liquid by means of the manifold 46 through the lower reactor grid 14 as is the case with the tubes 29d, 29e and 29f. In this manner, since each tube is specialized in one of the two functions of emergency water injection or poisoning liquid injection, there is no problem of interference between the two circuits and the presence of a diaphragm such as 49 (shown in FIG. 5) is no longer necessary. Also in FIG. 6, there is shown as a complementary feature an array of control rods 42 formed of neutron-absorbing material such as hafnium and slidably fitted within a series of tubes 29 provided for this purpose.

Figure 7:
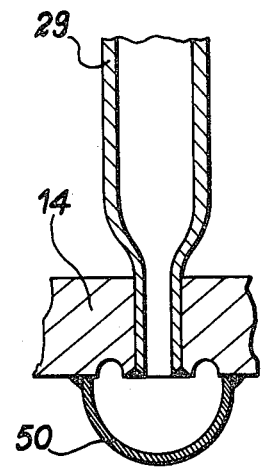
FIG. 7 is a detail view showing one form of construction of the duct for admission of the poisoning liquid.

FIG. 7 illustrates an alternative arrangement of the system for supplying poisoning liquid to the tubes 29. In this alternative arrangement, the duct 50 for conveying said liquid towards the tubes 29 is constituted by a half-shell welded to the underface of the lower reactor grid 14.

Figure 8:
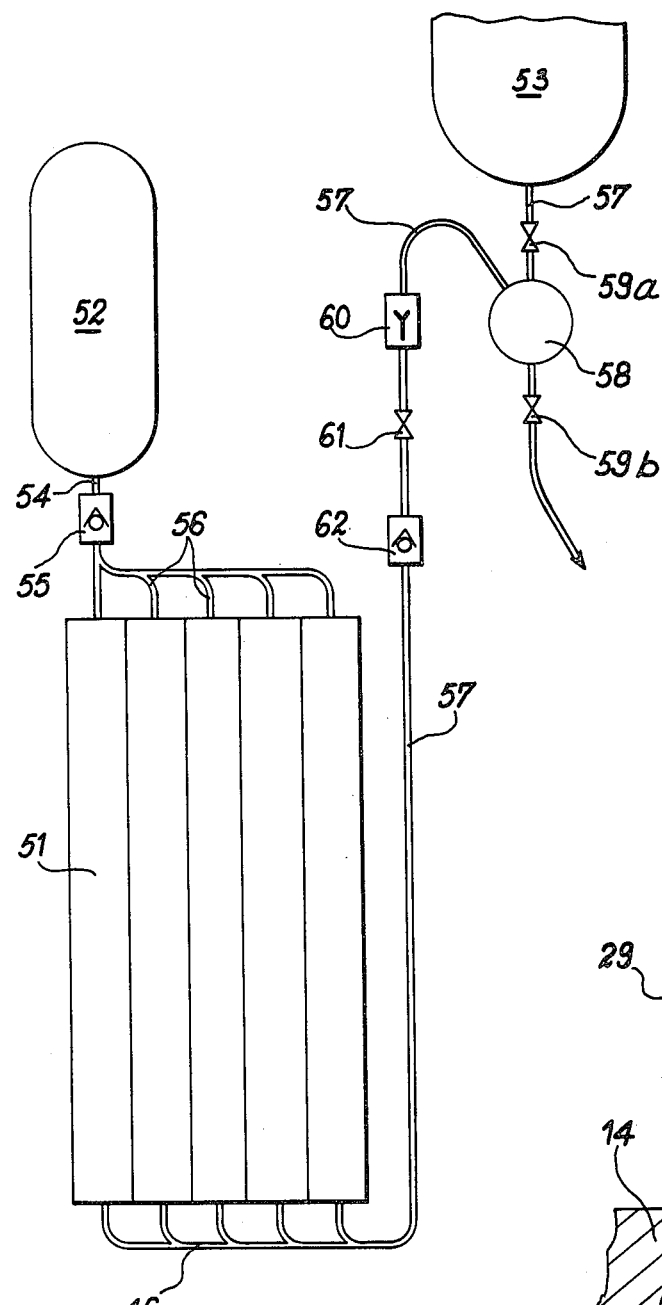
FIG. 8 is a general diagram showing the circuits for supplying the reactor with emergency water and with poisoning liquid.

Finally, FIG. 8 shows a general diagram of the devices for injection of emergency coolant and poisoning liuqid into the core 51 of a water-cooled reactor. The emergency coolant water is stored at low pressure within the reservoir 52 and the emergency poisoning liquid which can be boron-containing water for example is stored in the high-pressure reservoir 53. The injection of emergency coolant water takes place under the action of gravity by means of the pipe 54 which is fitted with the valve 55. The pipe 54 then discharges into the different manifolds 56 and these latter feed the upper ends of a certain number of vertical tubes 29 which constitute the walls of the casing. The poisoning liquid is distributed under pressure by the pipe 57 through a buffer reservoir 58, a first valve 59a, a second valve 60 of the explosive type, a third valve 61 and a dynamic control valve 62. The manifold 46 supplies at the base of the reactor through the plate 14 the lower ends of the vertical tubes 29 which constitute the framework of the casing. Finally, a drain outlet is provided through a valve 59b. In the event of emergency, it is by initiating rapid opening of the valve 60 by explosion that injection of the poisoning liquid into the reactor core is initiated.

Figure 9:
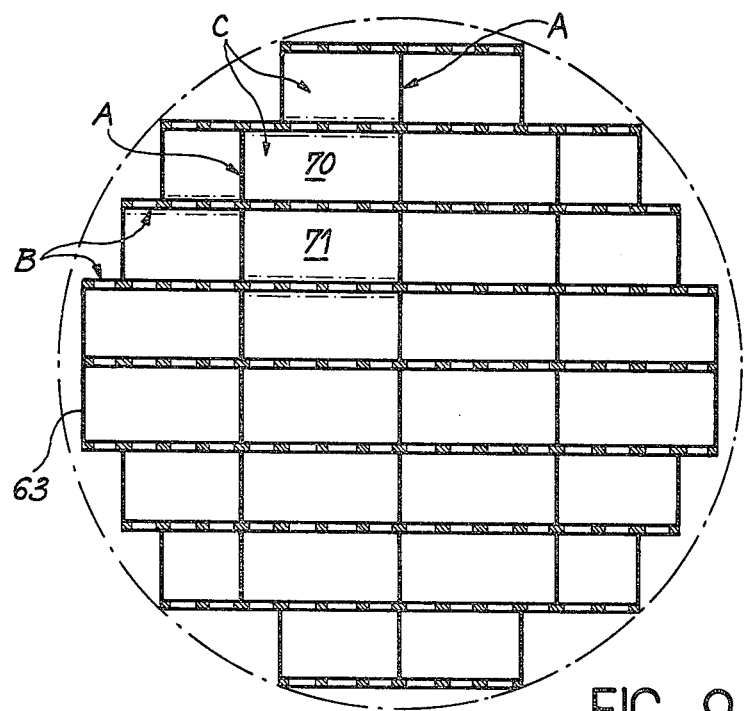
FIG. 9 is a transverse sectional view taken along the axis of the reactor and showing a fuel element casing as constructed in accordance with the second embodiment of the present invention.
Figure 10:
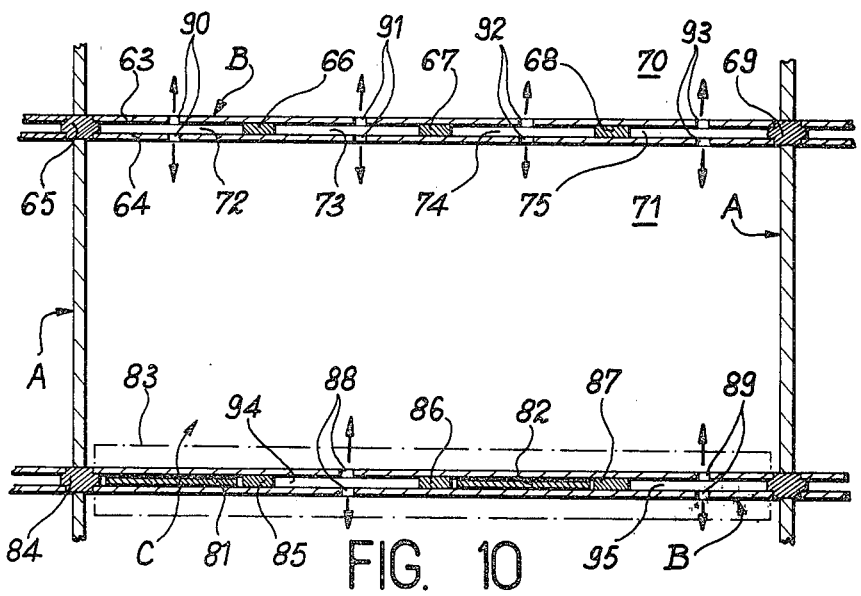
FIG. 10 is an enlarged view showing one compartment of FIG. 9.

FIGS. 9 and 10 relate to the second embodiment of the present invention and show the cross-section 63 of a casing in accordance with the invention. Said casing is composed of two families A and B of walls at right angles which define the compartments such as C. The walls of the family B are formed in accordance with the invention by two thin parallel metal sheets such as the sheets 63 and 64 which are welded at intervals as shown at 65, 66, 67, 68 and 69 in the case of the compartments 70 and 71 to solid metallic stiffening bars of parallelepipedal shape. Said stiffening bars are shown in FIGS. 9 and 10 only in cross-section in the form of hatched rectangles but in fact extend along the entire casing structure in a direction parallel to the axis of the reactor. The stiffening bars disposed in this manner define free parallelepipedal spaces such as the spaces 72, 73, 74 and 75 in the wall which is common to the compartments 70 and 71. Said free spaces perform the same functions as the hollow tubes such as those designated by the references 29, 30, 31, 32 and 33 for example in FIG. 1: they can in fact be employed to accommodate parallelepipedal absorber strips or, if so desired, may also be reserved for the injection of emergency water by means of orifices pierced at different levels in the thin metal sheets such as the sheets 63 and 64.

There are shown in FIG. 10 the cross-sections of the parallelepipedal absorber strips 81 and 82 which are rigidly fixed to the connecting body 83 (shown in chain-dotted lines since this latter is located outside the plane of the figure) and housed within the parallelepipedal free spaces defined by the solid metal bars 84, 85 and 86, 87 and the double wall B. There are also shown in FIG. 10 the orifices 88, 89, 90, 91, 92 and 93 for the injection of emergency coolant from the parallelepipedal free spaces 94, 95, 72, 73, 74 and 75, which are connected for this purpose, in the same manner as the orifices of the hollow tubes 29 to 33 of FIG. 1, to devices for injection of emergency water and/or for neutron poisoning of the reactor.

What we claim is:

1. In a water-cooled nuclear reactor having a casing for said reactor, spaced walls for said casing, a plurality of identical compartments of parallelopipedal shape in said casing, bundles of fuel elements vertically disposed in said compartments, control rods for the nuclear reactor, means for guiding said control rods in said spaced walls of said casing, means for supplying emergency coolant between said spaced walls of said casing, measuring devices for said reactor, and means for positioning said measuring device in said spaced walls of said casing, the improvement comprising said spaced casing walls being two spaced parallel metal sheets of small thickness, stiffening webs welded at intervals to and between said sheets, said webs extending between said two metal sheets to the full height of the casing and parallel to the axis of the reactor, said webs including flat arrays of vertical and tangent tubes welded in a sandwich arrangement between said two flat metal sheets, a plurality of said vertical and tangent tubes being apertured along the generating line of contact between said tubes and said flat sheets establishing communication between the interior of said tubes and the internal space of the casing compartments, and also said webs including solid metal bars of rectangular parallelopipedal shape spaced at uniform intervals and defining between said two parallel metal sheets of small thickness parallelopipedal free spaces, a plurality of orifices in said metal sheets spaced at intervals over the entire surface of said sheets for communication between said free spaces and the adjacent compartments of said casing.

2. A reactor according to claim 1, including means for injection of emergency water and also liquid for neutron poisoning of the reactor into said plurality of tubes.

3. A reactor according to claim 1, including means for injection of emergency water and also liquid for neutron poisoning of the reactor connected to said free spaces, said means for supplying said parallelopipedal free spaces with emergency water including at the top ends of said spaces a duct in the upper grid of the reactor core and including at the bottom ends of said spaces a duct connected to the bottom plate of said reactor core.

* * * * *